(12) United States Patent
Sharma

(10) Patent No.: US 6,977,745 B2
(45) Date of Patent: Dec. 20, 2005

(54) METHOD AND APPARATUS FOR THE SECURE PRINTING OF A DOCUMENT

(75) Inventor: Megha Sharma, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 675 days.

(21) Appl. No.: 10/022,462

(22) Filed: Oct. 30, 2001

(65) Prior Publication Data

US 2003/0081247 A1 May 1, 2003

(51) Int. Cl.$^7$ ............................................. G06F 15/00
(52) U.S. Cl. ...................................... 358/1.15; 380/30
(58) Field of Search ............................. 358/1.12, 1.13, 358/1.14, 1.15, 401, 406, 407; 713/155, 165; 380/30

(56) References Cited

U.S. PATENT DOCUMENTS

| | | | |
|---|---|---|---|
| 5,512,977 A | 4/1996 | Imai | |
| 5,790,790 A | 8/1998 | Smith et al. | ............ 395/209.36 |
| 6,081,610 A | 6/2000 | Dwork et al. | |
| 6,314,521 B1 * | 11/2001 | Debry | ......................... 713/201 |
| 6,378,070 B1 * | 4/2002 | Chan et al. | .................. 713/155 |

FOREIGN PATENT DOCUMENTS

| | | | |
|---|---|---|---|
| EP | 0 907 120 A2 | 4/1999 | ............. G06F 1/00 |
| EP | 1 031 909 A2 | 8/2000 | ............. G06F 1/00 |
| EP | 1 091 285 A2 | 4/2001 | ............. G06F 3/12 |
| EP | 1 146 684 A2 | 10/2001 | ............. H04L 9/00 |
| GB | 2 361 211 A | 10/2001 | ............. B41M 3/14 |
| WO | WO 01/50691 A2 | 7/2001 | ............ H04L 12/58 |
| WO | WO 01/73530 A2 | 10/2001 | ............. G06F 1/00 |

* cited by examiner

*Primary Examiner*—Mark Wallerson
(74) *Attorney, Agent, or Firm*—Steven J. Shapiro; Angelo N. Chaclas

(57) ABSTRACT

A method for securely controlling the printing of a plaintext document generated by a first source includes the steps of receiving at a printer via a first communication channel a first key sent by the first source and obtaining at the printer a second key based on communication between the printer and a second source. The printer receives from the second source via a second communication channel an encrypted version of the plaintext document. The printer decrypts, using the first and second keys, the encrypted version of the plaintext document to obtain the plaintext document at the printer and then prints the plaintext document. A system incorporates the method.

16 Claims, 3 Drawing Sheets

METHOD AND APPARATUS FOR THE SECURE PRINTING OF A DOCUMENT

FIELD OF THE INVENTION

The present invention relates to the transfer and viewing of documents, and more particularly to a method and apparatus that transfers and prints a document in a highly secure manner.

BACKGROUND OF THE INVENTION

FIG. 1 shows a prior art electronic communication system 1 that is used to securely transfer documents from a sender 2 to a recipient 3 by way of a server 5. Sender 2 is a personal computer within which a plaintext document 6 is created. The transmission of the contents of document 6 is accomplished via a secure socket layer (SSL) channel 7. Accordingly, as is known in the art, as part of the SSL transmission mechanism the document 6 is not sent in plaintext but is encrypted and transmitted as an encrypted document 8.

Server 5 decrypts the encrypted document 8 and stores the plaintext document 6 in associated memory 9. The server 5 then electronically notifies a recipient computer 3 that the plaintext document 6 is available at the server 5 for downloading and/or viewing by the recipient computer 3. The recipient computer 3 transmits a recipient password to the server 5 in order to gain access to the document 6. Server 5 has stored in memory 9 the passwords for any recipient and therefore is able to verify whether the received password is the one associated with the recipient to which the server 5 provided notification. If verification is successful, server 5 downloads the contents of document 6 as an encrypted document 11 via an SSL channel 12 in the same manner as discussed above for the initial transmission of the document contents from the sender 2 to the server 5. Upon receipt of the encrypted document 11 at the recipient computer 3, it is decrypted using conventional browser technology so that it can be stored at the recipient computer 3 as document 6 and subsequently printed.

While the system 1 provides some security by using the SSL channels (7, 12) to securely transmit the contents of the document 6, it still has inherent security risks associated therewith. For example, system 1 requires complete trust that the server 5 operation is sufficient to protect the document 6 that is stored in memory 9. Access to the document 6 at the server may be possible thereby compromising the security of document 6. Further, even assuming that document 6 could be encrypted by server 5 and stored in an encrypted form, the server 5 still has the capability to decrypt the document into a plaintext and viewable format. Thus, relative to the server 5, the contents of the document 6 can always be made available.

Additionally, recipient access to the document 6 at server 5 is accomplished by having knowledge of a recipient's password. Anyone with the password can gain access to the document 6. Moreover, since many password systems lock out access once a predetermined number of unsuccessful passwords have been entered, a third party could deny legitimate access to a document by an intended recipient simply by entering incorrect passwords into the system. Accordingly, a more robust and secure document viewing system is needed.

SUMMARY OF THE INVENTION

The instant invention provides a method for securely controlling the printing of a plaintext document generated by a first source that includes the steps of receiving at a printer via a first communication channel a first key sent by the first source and obtaining at the printer a second key based on communication between the printer and a second source. The printer receives from the second source via a second communication channel an encrypted version of the plaintext document. The printer decrypts, using the first and second keys, the encrypted version of the plaintext document to obtain the plaintext document at the printer and then prints the plaintext document. The instant invention is also applicable to any type of recording device as set forth in the appended claims.

DETAILED DESCRIPTION OF THE PREFERRED EMBODIMENTS

Figure 2:
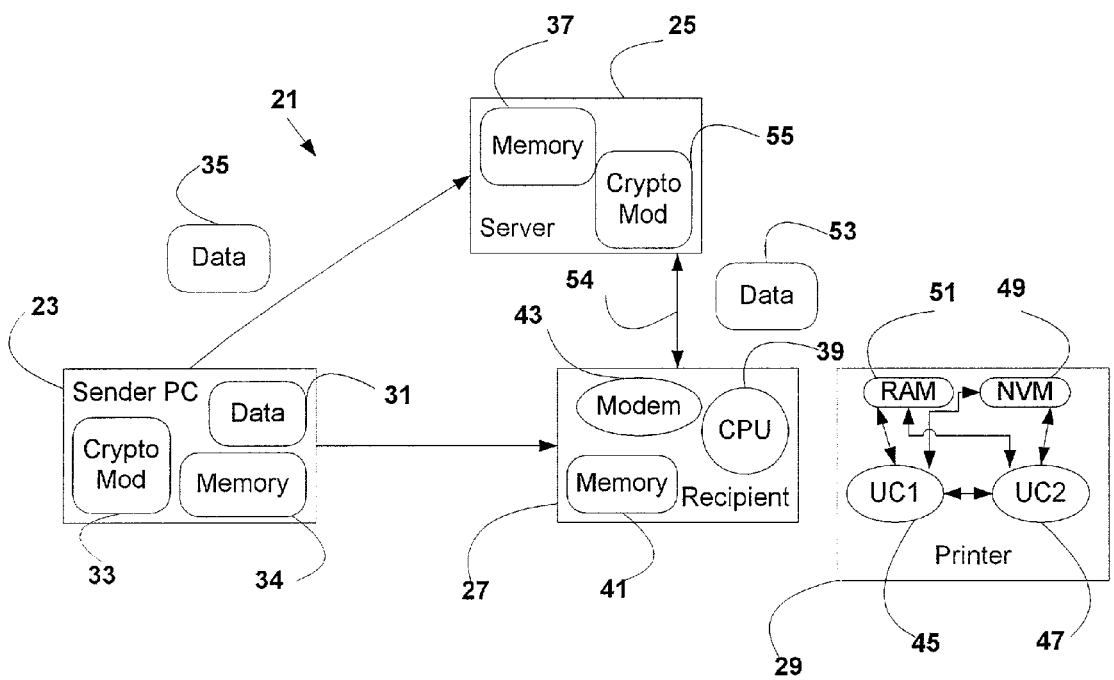
FIG. 2 shows in schematic form the inventive secure electronic document transfer system.
Figure 3:
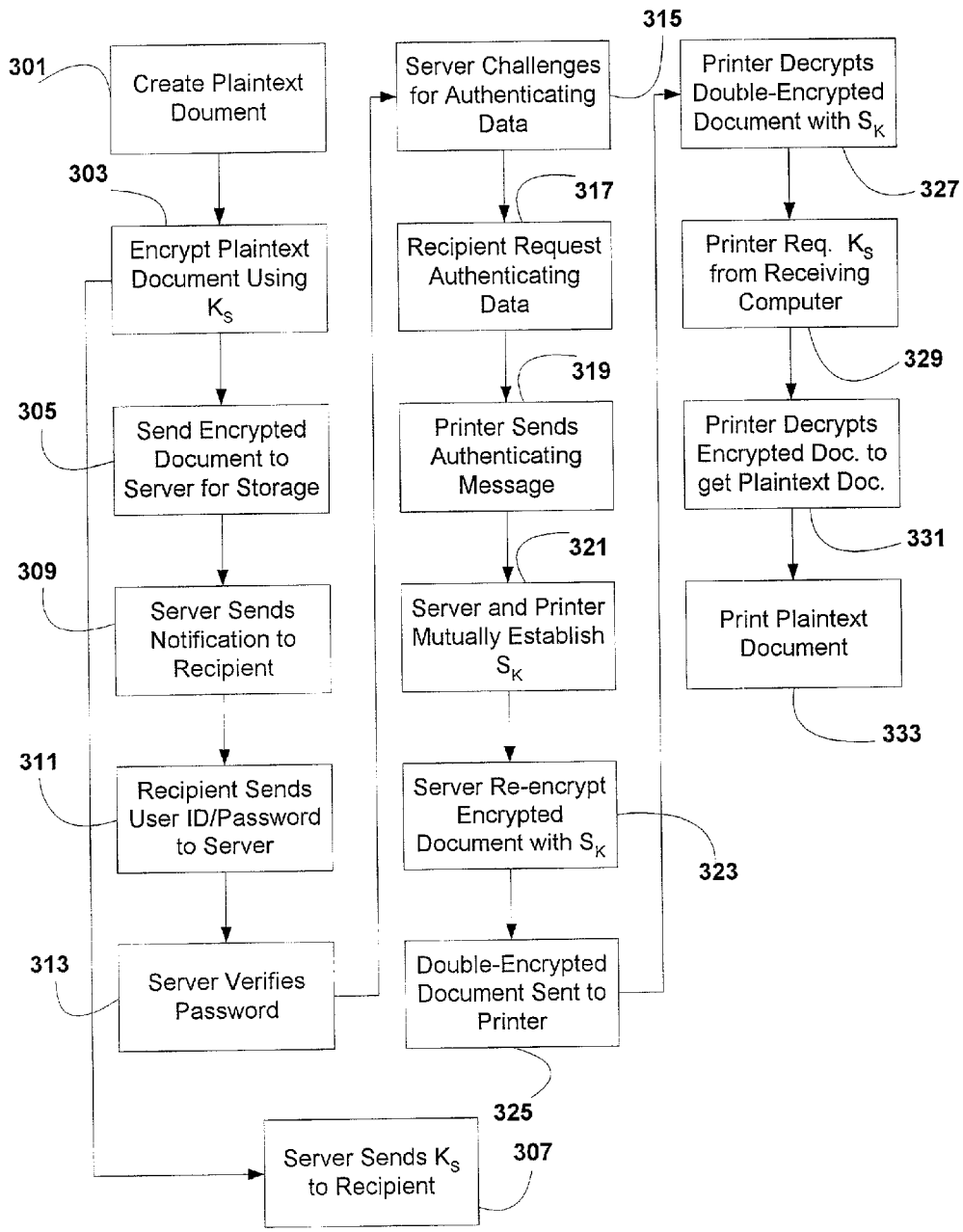
FIG. 3 is a flowchart showing the operation of the secure electronic document transfer system shown in FIG. 2.

FIG. 2 shows an embodiment of a secure electronic document transfer system (SETS) 21 that includes a sender personal computer 23, a server 25, a recipient computer 27 and a printer 29. Referring to FIGS. 2 and 3, the operation of SETS 21 will be described. At step 301 a plaintext document 31 is created at the sender personal computer 23 using conventional software. When a user wishes to transmit the document 31 to a specific recipient in a secure manner, a conventional cryptographic module 33 is used to create an encrypted document 35 (step 303). The cryptographic module applies a known encryption algorithm, such as the Data Encryption Standard (DES), to the plaintext document 31 and a sender secret key $K_s$ (that is stored memory 34 in the sender personal computer 23) to create the encrypted document 35=DES(Document 31, $K_s$) (step 303). Encrypted document 35 is electronically transmitted via a secure (SSL) or non-secure channel 36 to server 25 where it is stored in memory 37 (step 305). The encrypted document 35 therefore cannot be decrypted at server 25 and remains in a secure form relative to server 25 or anyone having access to server 25.

In addition to the transmission of the encrypted document 35, the secret key $K_s$ is sent by way of an electronic transmission or other mechanism (personal delivery, mailed) to the recipient for storage by central processing unit 39 (of recipient computer 27) in memory 41 (step 307). Further, once the server 25 receives the decrypted document 35 it provides notification to the recipient (preferably electronically directly to the recipient computer 27) that a document is available at the server 25 for the recipient (step 309). The recipient responds to the received notice by sending a password and User ID stored in memory 41 to the server 25 via modem 43 (step 311). The server 25 which has access to all recipient passwords and User ID's verifies that the received password is correct (step 313). If verification is successful, server 25 still does not make the encrypted document 35 available to the recipient computer 27. Rather, server 25 challenges the recipient computer 27 to provide authenticating information for the associated printer 29 that will be used to print the plaintext document 31 (step 315).

The printhead 29 includes a first microprocessor 45, a second microprocessor 47, RAM 51 and NVM 49. The first microprocessor 45 controls the overall operation of the printhead 29 based on operating programs stored in NVM 49. The second microprocessor 45 is dedicated to performing the cryptographic functions associated with printhead 29 as discussed further below. RAM 51 is used in a conventional manner for the temporary storage of data and executable code. Accordingly, subsequent to step 315, CPU 39 requests from the printhead 29 the required authenticating information (step 317). In response, printhead 29 uses its printhead key $K_{PH}$ (which is securely stored in NVM 49) to provide an encrypted authentication message including a printhead identifier (printer ID) to the server 25 via the recipient computer 27 (step 319). Server 25 has access to each $K_{PH}$ for each printhead and therefore can authenticate the message from printhead 29 in a conventional manner.

Once the authentication has been accomplished, the server 25 and printhead 29 communicate via recipient computer 27 to mutually agree on a session key $S_K$ using the Diffie-Hellman algorithm (step 321). The server 25 then re-encrypts the encrypted document 35 using any conventional encryption algorithm and $S_K$ to produce a double-encrypted document 53=E(document 35, $S_K$) (step 323). The server 25 then sends the double-encrypted document 53 to the printer 29 via the receiving computer 27 using a secure (SSL) or non-secure channel 54 (step 325).

Upon receipt of double-encrypted document 53, the printhead 29 uses the second microprocessor 47 to perform a first decryption operation on the double-encrypted document 53 using $S_K$ and the required encryption algorithm to produce encrypted document 35 (step 327). The printhead 29 then requests $K_S$ from the recipient computer 27 (step 329) and upon receipt of $K_S$ performs a second decryption operation on encrypted document 35 at the second microprocessor 47 to obtain the plaintext document 31 (step 331). The printhead 29 is then programmed to print put the plaintext document 31 (step 333).

It is pointed out that the printhead 29 can be programmed to print only a single or a predetermined number of copies of the plaintext document 31 for auditing control purposes. Upon the printing of the controlled number of printings, the printhead first microprocessor 45 ensures that the plaintext document 31, $K_S$, and $S_K$ are not retained in any memory of the printer 29 thereby precluding any further printing of the plaintext document 31. If another printed copy of plaintext document 31 is needed, a completely new communication with server 25 is required and steps 311 to 333 must be carried out again.

By allowing the printer 29 to control the number of printed copies of the plaintext document 31 the inventive process eliminates the recipient from controlling the printing operation. Further, conventional forensic techniques can be used during the printing of the document 31 in order to enable the detection of fraudulently made copies of the printed plaintext document 31. For example, a particular special dot matrix print pattern may be used during printing which pattern cannot be reproduced by a conventional copier. Thus, complete control over the permissible distribution of the printed document 31 is maintained. Further, server 25 can maintain an audit record showing which recipient and which printer 29 were involved with the printing of a particular document 31.

In a further embodiment, the server 25 controls the number of permissible printings of the plaintext document 31 by sending together with the double-encrypted document 53 an indication as to the permitted number of printed copies that can be made by the printer 29. The server 25 would also include a unique identifier for each of the printed copies which would be included in the printed copy for the purpose of a complete auditing system. This SETS 21 uses in a secure or legal environment where strict control of the number of permitted copies of a document is needed. Further, this system can be used in a commercial environment to only permit the printing of a specific number of digital content products that have been properly paid for and to permit the detection of fraudulently copied items.

Figure 1:
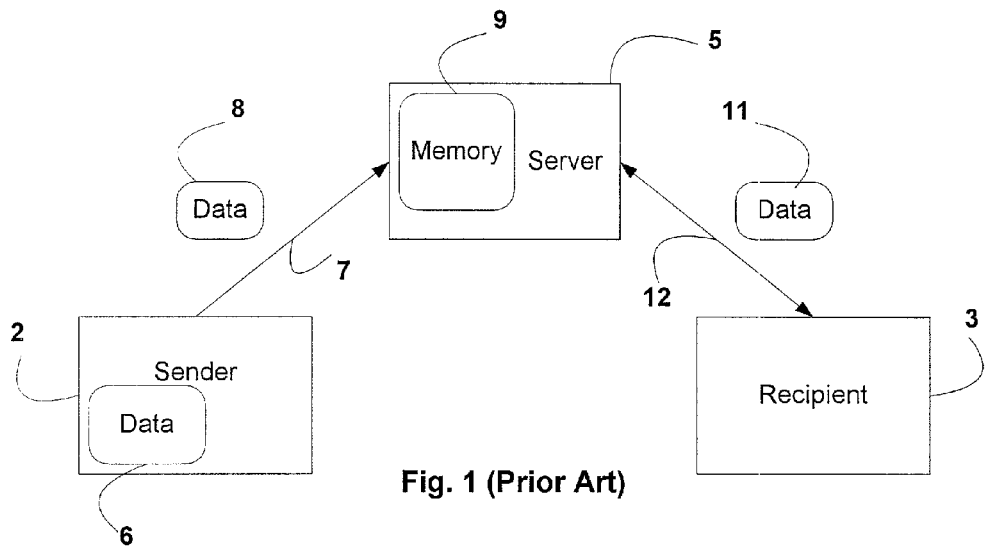
FIG. 1 shows in schematic form a conventional electronic document transfer system.

The invention described above has many advantages over the prior art system of FIG. 1. It can be used in a buyer and seller situation where offers and acceptances are being made via a third party server. The third party server provides an auditing capability of the transactions while the nature of the transaction remains hidden from the third party server. Additionally, since end-to-end encryption is utilized, protection against a man-in-the-middle attack is provided. Further, even if an SSL channel is used, the end-to-end encryption provides an additional level of security.

Furthermore, the SETS 21 uses a distributed multiple key system providing for a more secure system based on a distribution of trust. In the above-described embodiment three keys $K_S$, $K_{PH}$, and $S_K$ are used. However, in order to view (print) the plaintext document 31 one of the following key pairs is needed $K_S$, $K_{PH}$ $K_S$, $S_K$ The server 25 and recipient computer 27 do not have any of the above key pairs and therefore cannot obtain the plaintext document 35. The server 25 only has $K_{PH}$ and $S_K$ while the recipient computer 27 only has $K_S$. The printhead 29 is the only entity that has access to all three keys and needs to prompt the recipient computer 27 and server 25 in order to obtain two of those keys $K_S$ and $S_K$. Hence the only way to view the document 35 is to print it. Further, the printhead 29 only retains the two keys $K_S$ and $S_K$ until the print operation is completed and must re-obtain these keys for future printings. Accordingly, unlike the prior art system in order for an unauthorized person to get access to a document 35 (or to lock out a recipient from a document 35) they not only have to get access to a recipient password but must also have physical access to a recipient's printhead 29.

The above described system can be modified where a single printer 29 is used by multiple users and strict accountability for each user is desired as well as a mechanism to lock out individual users without locking out the printer 29 to the other users. In this scenario, printer 29 will have a separate key stored therein for each user. Accordingly, when the server 25 requests the printer 29 to authenticate itself, the recipient will be asked by the printer 29 for a user ID and a password so that the printer 29 can identify the UserKey associated with that user for use in completing the instant transaction.

Figure 4:
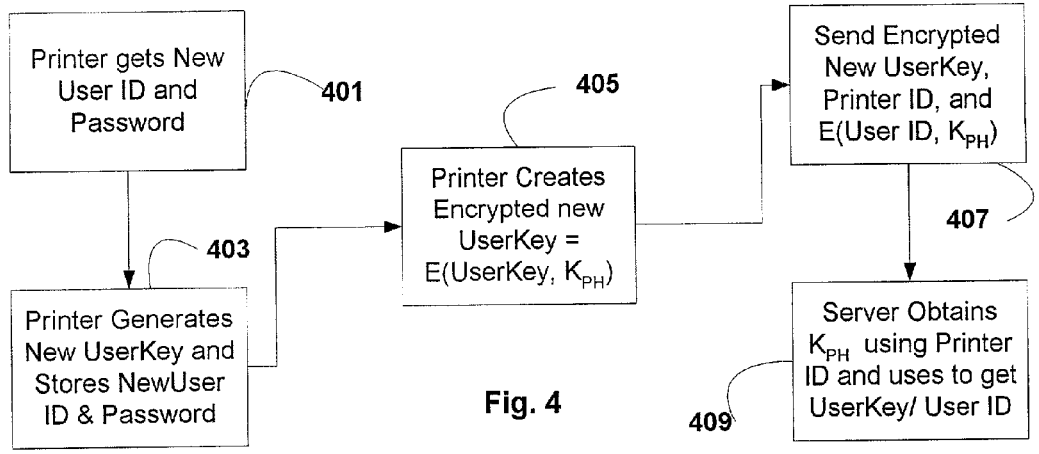
FIG. 4 is a flowchart showing the generation and secure transmittal of UserKeys for a multi-user, single printhead embodiment of the invention.

Moreover, the multiple user system permits additional users to be added to the printer 29. When a new user is added, the printer 29 generates a new UserKey for that user which is sent to the server 25 for use in the printer 29 authentication process. The transfer of the new UserKey takes place as shown in FIG. 4. At step 401, the printer 29 is provided with the new user ID and associated password. Printer 29 generates the new UserKey and stores it in memory 49 in association with the new user ID and password (step 403). Printer 29 then encrypts the new UserKey using $K_{PH}$ to get encrypted new UserKey= E(UserKey, $K_{PH}$) (step 405). The encrypted new UserKey the printer 29 ID, and E(user ID, $K_{PH}$) are sent by printer 29 via computer 27 to server 25 (step 407). The server looks up the printer 29 ID to obtain the $K_{PH}$ for that printer and then decrypts the encrypted new UserKey and E(UserKey, $K_{PH}$) to obtain and store in memory 37 the UserKey and its associated User ID (step 409).

Figure 5:
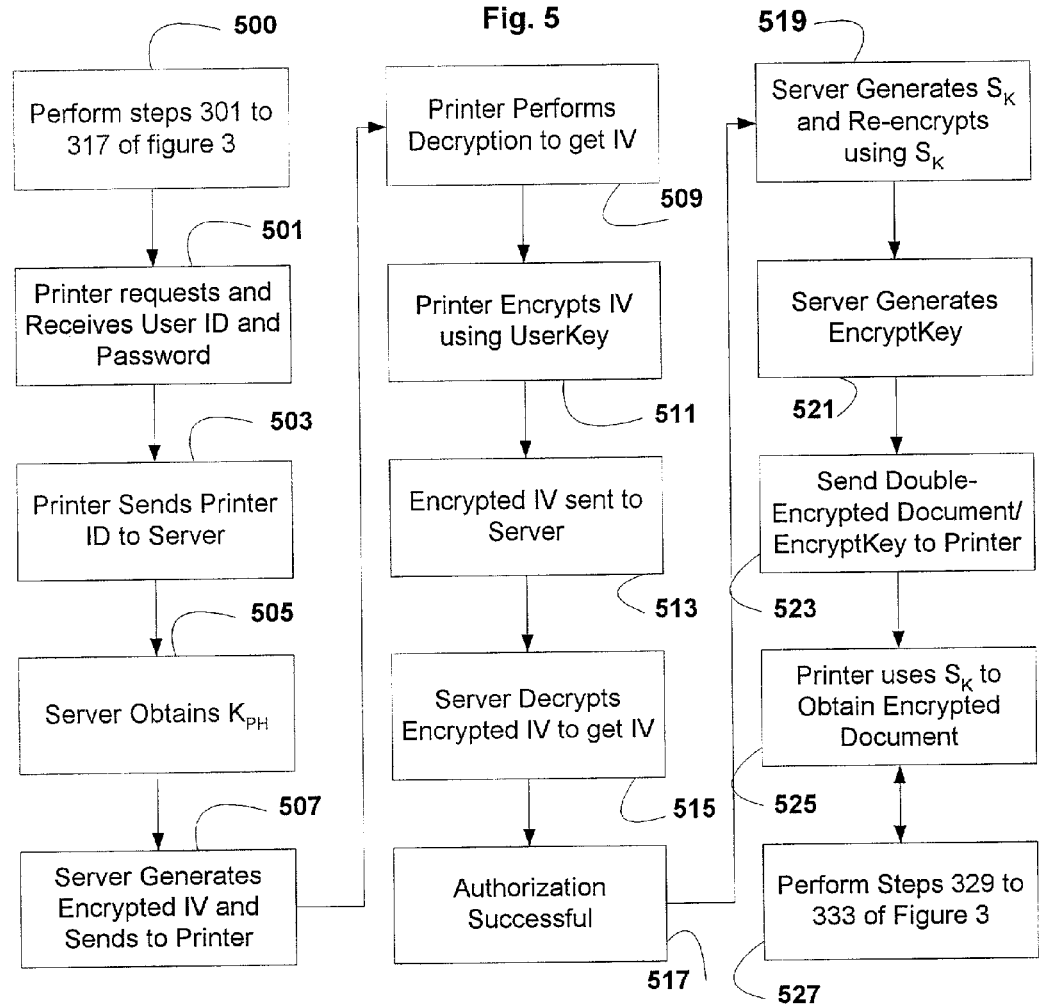
FIG. 5 is a flowchart showing the operation of a secure electronic document transfer system using the multi-user, single printhead inventive concept.

FIG. 5 shows the processing of a plaintext document 31 in the multiple user/single printhead environment. Step 500 shows that the process begins by following steps 301 to 317 of FIG. 3. Next however, in order to authenticate itself the printer 29 must first request and receive from the receiver (via computer 27) the User ID and associated password (step 501). The printer 29 then sends its printer ID to the server 25 (step 503). Server 25 looks up the corresponding key $K_{PH}$ associated with the Printer ID (step 505). The server 25 then generates an initial vector IV which it encrypts with $K_{PH}$ to get E(IV, $K_{PH}$) which is sent to the printer 29 (step 507). The printer 29 decrypts E(IV, $K_{PH}$) to obtain IV (step 509). Printer 29 then encrypts IV using the UserKey associated with the User ID and password specified by the user (step 511). The E(IV, User Key) is sent to the server 25 (step 513) and the server 25 decrypts this value to obtain IV (step 515). If IV is obtained at the server, authentication has been successfully completed (step 517).

Once the authentication is successful, server 25 generates a session key $S_K$ and re-encrypts the encrypted document 35 to obtain the double encrypted document 53=E(encrypted document, $S_K$) (step 519). Server 25 also generates EncryptKey=E($S_K$, UserKey) (step 521) and sends the double encrypted document 53 and the EncryptKey to the printer 29 (step 523).

The printer 29 upon receipt of the double-encrypted document and EncryptKey decrypts the EncryptKey with the UserKey to get $S_K$ and then decrypts the double-encrypted document 53 with $S_K$ to get the encrypted document 35 (step 525). At this point in time, the printer 29 performs the steps 329 to 333 of FIG. 3 to obtain and print the plaintext document 31 (step 527).

It is thus apparent from the above, that precise auditing and control of documents can be maintained when multiple users have access to a single printer 29 since all transactions are accounted for at the server 25 based on a user ID, user password, and a specific UserKey associated with a specific printer 29.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims. For example, while the session key $S_K$ in FIG. 3 is mutually agreed upon, it could simply be generated at the server 25. Under this procedure, steps 315–327 are not followed. Rather, in lieu thereof steps 503–505 and 519–525 are followed.

Additionally, the instant invention can be used to control the writing/reproduction of digital content in associated products. That is, instead of a printer 29 the instant invention could be incorporated in a Compact Disc writer or any other recording apparatus to ensure that only a predetermined number of reproductions are permitted. Accordingly, as used in this application the term "recording apparatus" refers to printers, CD writers, or any known device that can reproduce digital content products on a recording medium.

Further, while the recipient computer 27 is shown as interfacing with the printer 29 and the server 25, it could be eliminated so that the printer 29 communicates directly with the server 25.

Moreover, the printer 29 can be programmed to send a verification message back to the server 25 which verifies that the document 31 has actually been printed. The verification message can be sent in a form that permits the server 25 to verify that it came from the printer 29.

Finally, SETS 21 can be implemented in a Local Area Network, a Wide Area Network, or using the internet. Accordingly, conventional means of communications can be used including telephone modems, direct connection lines (i.e. Ti, T3), cable modems, and fiber optics.

What is claimed is:

1. A method for securely controlling the printing of a plaintext document generated by a first source, the method comprising the steps of:
   receiving at a printer via a first communication channel a first key sent by the first source;
   obtaining at the printer a second key based on communication between the printer and a second source;
   receiving at the printer from the second source via a second communication channel an encrypted version of the plaintext document that cannot be decrypted at the second source to obtain the plaintext document;
   decrypting at the printer using the first and second keys the encrypted version of the plaintext document to obtain the plaintext document at the printer; and
   printing with the printer the plaintext document obtained at the printer via the decrypting at the printer of the encrypted version of the plaintext document; and
   ensuring that the printer can only print a predetermined number of copies of the plaintext document obtained at the printer via the decrypting at the printer of the encrypted version of the plaintext document;
   wherein the second communication channel is an electronic communication channel.

2. A method as recited in claim 1, wherein the second communication channel is a secure electronic communication channel.

3. A method as recited in claim 1, wherein the second communication channel is a non-secure electronic communication channel.

4. A method as recited in claim 1, wherein the predetermined number is one.

5. A method as recited in claim 4, further comprising storing in a memory in the printer the first and second keys, the encrypted version of the plaintext document, and the plaintext document obtained at the printer via the decrypting at the printer of the encrypted version of the plaintext document, and subsequent to the printing of the predetermined number of copies of the plaintext document obtained at the printer via the decrypting at the printer of the encrypted version of the plaintext document 1) deleting from the memory the plaintext document obtained at the printer via the decrypting at the printer of the encrypted version of the plaintext document and 2) deleting from the memory one of the first key, the second key, and the encrypted version of the plaintext document.

6. A method as recited in claim 1, further comprising obtaining electronically at the printer the predetermined number from the second source.

7. A method as recited in claim 1, wherein the second source maintains an audit record of the number of copies printed at the printer of the plaintext document obtained at the printer via the decrypting at the printer of the encrypted version of the plaintext document.

8. A method as recited in claim 1, further comprising printing the plaintext document obtained at the printer via the decrypting at the printer of the encrypted version of the plaintext document to include forensic evidence of the authenticity of the printed plaintext document.

9. A method for securely controlling the printing of a plaintext document generated by a first source, the method comprising the steps of:
 receiving at a printer via a first communication channel a first key sent by the first source;
 obtaining at the printer a second key based on communication between the printer and a second source;
 receiving at the printer from the second source via a second communication channel an encrypted version of the plaintext document that cannot be decrypted at the second source to obtain the plaintext document;
 decrypting at the printer using the first and second keys the encrypted version of the plaintext document to obtain the plaintext document at the printer; and
 printing with the printer the plaintext document obtained at the printer via the decrypting at the printer of the encrypted version of the plaintext document; and
 performing a first encryption operation on the plaintext document thereby creating an encrypted form of the plaintext document and subsequently performing a second encryption operation on the encrypted form thereby creating the encrypted version of the plaintext document;
 wherein the second communication channel is an electronic communication channel.

10. A method as recited in claim 9, wherein the first encryption operation is performed at the first source, the encrypted form is sent electronically from the first source to the second source, the encrypted form is stored at the second source, the second source does not have the ability to decrypt the encrypted form, and the second source performs the second encryption operation on the encrypted form.

11. A method as recited in claim 10, wherein the second source is a server and the second key is generated at the server and sent to the printer via the second communication channel.

12. A method as recited in claim 10, wherein the second source and the printer communicate to mutually agree on the second key.

13. A system for securely transmitting and printing documents comprising:
 a computer system that encrypts a plaintext document using a first key thereby creating an encrypted document, the computer system including means for electronically transmitting the encrypted document via a first communication channel;
 a server connected to the first communication channel to receive the encrypted document from the computer system, the server including memory for storing the encrypted document, a processor for encrypting the encrypted document using a second key thereby creating a double-encrypted document, means for electronically transmitting the double-encrypted document via a second communication channel;
 a printer connected to the second communication channel, the printer having means for communicating with the server via the second communication channel to determine the second key and to receive the double-encrypted document from the server, means for receiving the first key from the computer system upon request, means for decrypting the double-encrypted document using the first and second keys to obtain the plaintext document and means for printing a only a predetermined number of copies of the plaintext document obtained from the decrypting of the double-encrypted document by the printer;
 wherein the server cannot decrypt the encrypted document to obtain the plaintext document.

14. A method for securely controlling the recording of an unencrypted digital content generated by a first source, the method comprising the steps of:
 receiving at a recording device via a first communication channel a first key sent by the first source;
 obtaining at the recording device a second key based on communication between the recording device and a second source;
 receiving at the recording device from the second source via a second communication channel an encrypted version of the unencrypted digital content, the receiving device not being capable of decrypting the encrypted version of the unencrypted digital content;
 decrypting at the recording device using the first and second keys the encrypted version of the unencrypted digital content to obtain the unencrypted digital content at the recording device; and
 recording on a recording medium with the recording device the unencrypted digital content obtained at the recording device via the decrypting at the recording device of the encrypted version of the unencrypted digital content;
 performing a first encryption operation on the unencrypted digital content thereby creating an encrypted form of the unencrypted digital content and subsequently performing a second encryption operation on the encrypted form thereby creating the encrypted version of the unencrypted digital content.

15. A method as recited in claim 14, wherein the seond communication channel is a secure electronic communication channel.

16. A method as recited in claim 14, wherein the seond communication channel is a non-secure electronic communication channel.

* * * * *